(12) United States Patent
Lynch et al.

(10) Patent No.: US 6,588,162 B2
(45) Date of Patent: Jul. 8, 2003

(54) REVERSE MOLDED PANEL

(75) Inventors: Steven K. Lynch, St. Charles, IL (US);
Dale E. Schafernak, Palatine, IL (US);
Karine Luetgert, Geneva, IL (US);
Bei-Hong Liang, Naperville, IL (US);
Lee Braddock, Huntley, IL (US)

(73) Assignee: Masonite Corporation, Tampa, FL (US)

( * ) Notice: Subject to any disclaimer, the term of this patent is extended or adjusted under 35 U.S.C. 154(b) by 0 days.

(21) Appl. No.: 09/761,394

(22) Filed: Jan. 16, 2001

(65) Prior Publication Data
US 2001/0029714 A1 Oct. 18, 2001

Related U.S. Application Data

(63) Continuation-in-part of application No. 09/742,840, filed on Dec. 21, 2000, now abandoned.
(60) Provisional application No. 60/198,709, filed on Apr. 20, 2000.

(51) Int. Cl.[7] .................................................. E04C 2/16
(52) U.S. Cl. ................... 52/309.13; 52/455; 52/784.11; 52/784.15; 52/794.1; 52/745.15; 52/745.16; 264/118; 264/119; 264/251; 428/156; 428/162; 428/165; 428/171; 428/537.1
(58) Field of Search ............................ 52/455, 784.11, 52/784.15, 794.1, 745.15, 745.16, 309.13; 264/118, 119, 251, 35, 46.4, 46.6, 162, 112, 39; 428/162, 163, 165, 168, 187, 537.1, 109, 156, 171, 248, 281, 286, 290

(56) References Cited

U.S. PATENT DOCUMENTS

| | | |
|---|---|---|
| 3,402,520 A | 9/1968 | Lee et al. |
| 3,634,986 A | 1/1972 | Ford et al. |
| 4,061,813 A | 12/1977 | Geimer et al. |
| 4,159,302 A * | 6/1979 | Greve et al. ................ 264/333 |
| 4,378,265 A | 3/1983 | Kiss |
| 4,552,797 A | 11/1985 | Munk et al. |
| 4,610,900 A | 9/1986 | Nishibori |
| 4,612,224 A | 9/1986 | Davis |
| 4,622,190 A | 11/1986 | Schultz |
| 4,726,881 A | 2/1988 | Schultz |

(List continued on next page.)

FOREIGN PATENT DOCUMENTS

| | | |
|---|---|---|
| DE | 12 10 551 | 2/1966 |
| EP | 0 225 628 A2 | 6/1987 |
| EP | 0 225 629 A2 | 6/1987 |
| EP | 0 688 639 A2 | 12/1995 |
| EP | 1 066 936 | 1/2001 |

(List continued on next page.)

OTHER PUBLICATIONS

U.S. patent application Ser. No. 09/833,128, Lynch et al., filed Oct. 18, 2001.

(List continued on next page.)

*Primary Examiner*—Carl D. Friedman
*Assistant Examiner*—Yvonne M. Horton
(74) *Attorney, Agent, or Firm*—Liniak, Berenato & White, LLC

(57) ABSTRACT

A reverse molded fiberboard panel; a wainscot kit comprising a plurality of differently sized reverse molded panels, and a planar finishing or spacer panel, adapted to completely cover any size wall between a wall base board and a wall chair rail; and a method of reverse molding a loose cellulosic mat, in a single pressing step, to provide one or more relatively high density, raised panels without requiring preliminary pressing, or other pre-shaping step, such as scalping. The reverse-molded panels are molded in a conventional, multi-opening fiberboard press, in a single pressing step process, while achieving excellent transfer of mold detail (embossing fidelity) without visually noticeable fiber fracture.

30 Claims, 6 Drawing Sheets

U.S. PATENT DOCUMENTS

| | | | |
|---|---|---|---|
| 4,734,236 A | 3/1988 | Davis | |
| 4,812,188 A | 3/1989 | Hansen | |
| 4,844,968 A | 7/1989 | Persson et al. | |
| 4,865,788 A | 9/1989 | Davis | |
| 4,960,548 A | 10/1990 | Ikeda et al. | |
| 4,960,553 A | 10/1990 | DeBruine et al. | |
| 4,969,302 A | 11/1990 | Coggan et al. | |
| 5,028,374 A | 7/1991 | Imao et al. | |
| 5,074,087 A | 12/1991 | Green | |
| 5,075,059 A | 12/1991 | Green | |
| 5,090,173 A | 2/1992 | Coggan et al. | |
| 5,142,835 A * | 9/1992 | Mrocca | 52/309.12 |
| 5,154,968 A | 10/1992 | DePetris et al. | |
| 5,175,970 A | 1/1993 | Green | |
| 5,397,406 A * | 3/1995 | Vaders et al. | 156/64 |
| 5,443,891 A | 8/1995 | Bach | |
| 5,470,631 A * | 11/1995 | Lindquist et al. | 428/105 |
| 5,525,394 A * | 6/1996 | Clarke et al. | 428/105 |
| 5,543,234 A * | 8/1996 | Lynch et al. | 428/537.1 |
| 5,647,934 A * | 7/1997 | Vaders et al. | 156/219 |
| 5,718,786 A * | 2/1998 | Lindquist et al. | 156/62.2 |
| 5,782,055 A | 7/1998 | Crittenden | |
| 5,851,325 A | 12/1998 | Terada et al. | |
| 5,887,402 A * | 3/1999 | Ruggie et al. | 52/455 |
| 6,161,363 A | 12/2000 | Herbst | |
| 6,189,276 B1 | 2/2001 | Pinto et al. | |
| 6,226,958 B1 | 5/2001 | West et al. | |
| 6,364,982 B1 * | 4/2002 | Lynch et al. | 156/196 |
| 6,397,541 B1 | 6/2002 | Brewer | |
| 2002/0108337 A1 | 8/2002 | Clarke et al. | |

FOREIGN PATENT DOCUMENTS

| | | |
|---|---|---|
| GB | 2 237 040 A | 4/1991 |
| JP | 59 059433 A | 4/1984 |
| WO | WO 99 62680 | 12/1999 |
| WO | WO 01 21369 | 3/2001 |

OTHER PUBLICATIONS

Panel Fast: Premium Timber Products, Ltd. product. Photos and advertising of "Panel Fast" product offered for sale in the United Kingdom as a wainscot treatment, possibly manufactured by Jeldwen.

* cited by examiner

Fig. 6A
Prior Art
Fig. 6
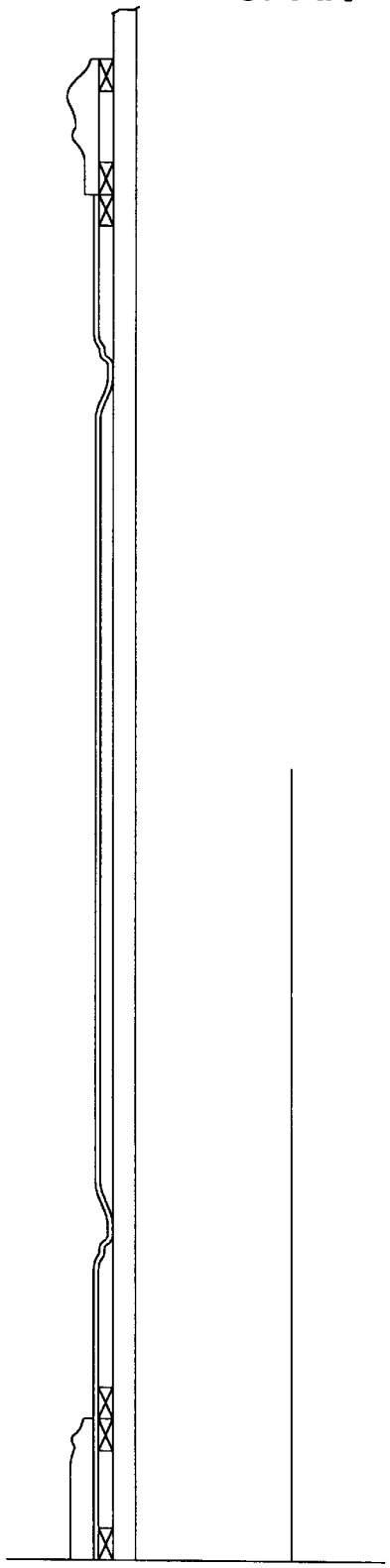
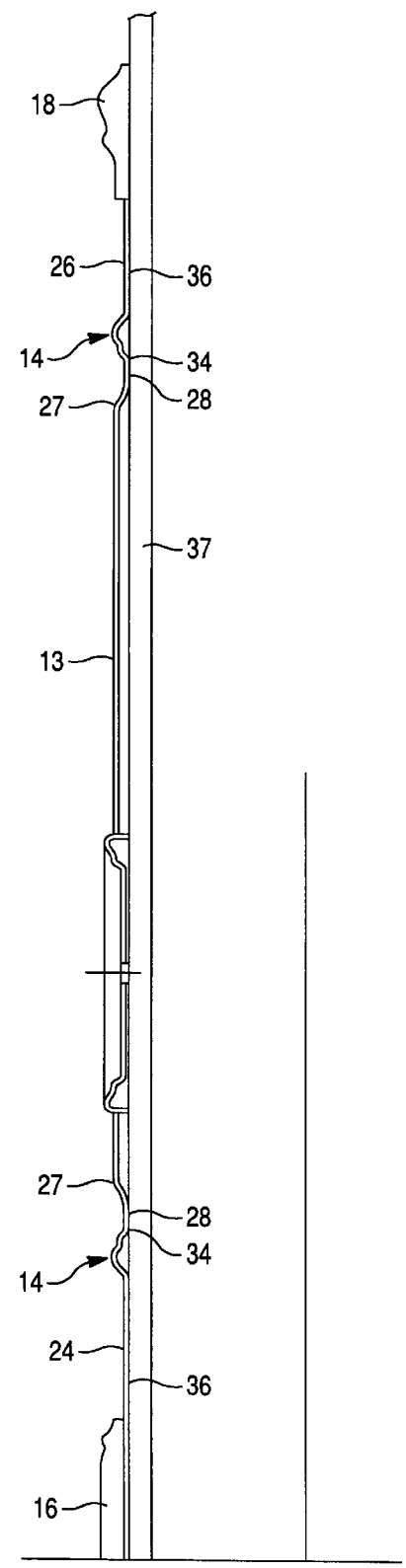

REVERSE MOLDED PANEL

CROSS-REFERENCE TO RELATED APPLICATION

This application is a continuation-in-part of U.S. application Ser. No. 09/742,840 filed Dec. 21, 2000, now abandoned. (Our Ref: 27502/IP6066) which is based on U.S. Provisional Patent Application Serial No. 60/198,709 filed Apr. 20, 2000.

FIELD OF THE INVENTION

The present invention relates to a reverse molded (profile up, as molded) wood composite article particularly useful for the manufacture of a wainscot panel, and also useful as a door skin or door-facing surface, and to a method of making the reverse molded wood composite article, having an upwardly inclined profile molded upwardly from a planar base portion of the article. More particularly, the molded wood composite article of the present invention is made from a cellulosic mat containing a combination of cellulosic fibers, preferably including at least about 40% by weight, preferably at least about 60%, softwood fibers, (from trees that produce cones) such as all species of pine, and fir, e.g., Southern Pine, based on the total dry fiber weight, and a natural or synthetic binder, such as a phenol formaldehyde or urea formaldehyde resin. The cellulosic mat includes at least about 80% refined, fibrillated cellulosic fibers, e.g., a fiberboard mat, such as that hot-pressed to produce hardboard. The upper surface of the molded article has excellent molding die fidelity and may have a smooth finish or may be embossed to simulate a hardwood grain pattern, such as oak, simulating furniture grade natural wood. The articles are molded from a planar layer or mat of cellulosic fibers, e.g., a fiberboard mat, made either by the wet process or the dry process, preferably the dry process. In a preferred embodiment, the fiberboard mat is one to three inches in thickness before molding, and after molding is ⅛ to ¼ inch in thickness having co-planar stiles and rails, and planar back surfaces surrounding the molded panels, such that the co-planar back surfaces are adapted for flush contact against a wall or door surface, particularly between a wall base board and chair rail, as a wainscot outer wall surface lining for an interior household wall. In accordance with another embodiment of the invention, the reverse molded panels are manufactured in a kit, including a plurality of differently sized panels adapted to completely line an interior wall, regardless of wall dimension.

BACKGROUND OF THE INVENTION

Man-made boards, such as fiberboard, e.g., hardboard, commonly are embossed downwardly on their intended visible major outer surface in the manufacture of interior paneling, exterior siding, and particularly in the manufacture of door skins, such that exterior surfaces, such as stiles and rails, are the highest structure of the embossed product. The prior art discloses that it is difficult to reverse mold and to emboss deep draws into a fiberboard panel due to stretching and breaking of the fibers. A reverse molded fiberboard is stretched more on its visible outer surface than on its interior surface (surface in contact with a raised mold surface) making reverse molding much more difficult when attempting to provide sharp, crisp design detail in a raised panel that simulates natural wood millwork. As disclosed in the following U.S. patents, reverse molding and embossing deep draws into a fiberboard panel generally requires one or more of multiple press steps, post mold curing at elevated temperatures, a foil or high resin content outer surface portion, and/or high binder resin content of about 5–25%, preferably at least 10% by weight of the product: U.S. Pat. No. 4,061,813 Geimer; U.S. Pat. No. 4,378,265 Kiss; U.S. Pat. No. 4,552,797 Munk; U.S. Pat. No. 4,610,900 Nishibori; U.S. Pat. No. 4,612,224 Davis; U.S. Pat. No. 4,622,190 Schultz; U.S. Pat. No. 4,726,881 Schultz; U.S. Pat. No. 4,734,236 Davis; U.S. Pat. No. 4,812,188 Hansen; U.S. Pat. No. 4,844,968 Persson; U.S. Pat. No. 4,865,788 Davis; U.S. Pat. No. 4,960,548 Ikeda; U.S. Pat. No. 4,960,553 DeBruine; U.S. Pat. No. 4,969,302 Coggan; U.S. Pat. No. 5,028,374 Imao; U.S. Pat. No. 5,090,173 Coggan; U.S. Pat. No. 5,154,968 DePetris; U.S. Pat. No. 5,443,891 Bach; U.S. Pat. No. 5,851,325 Terada; U.S. Pat. No. 5,887,402 Ruggie;

The cellulosic fibers used to form the loose mat, e.g., a one to two inch, preferably a 1½ or 1¾ inch thick layer of cellulosic fibers having a specific gravity of, for example, 0.6, initially may be bone dry after the fibers have been dried and felted, but the cellulosic fibers in such mats absorb moisture from the atmosphere and generally include about 2% to about 10% moisture when molded via hot pressing, depending upon the humidity in the region where such mats are stored and/or manufactured.

The reverse molded panels of the present invention are particularly suitable as wainscot panels. The panels are reverse molded to provide a "profile up" configuration. The reverse molding approach permits mounting the panel directly against a wall versus the prior art method requiring "shim spacers" (see FIG. 6A), thereby promoting easy installation while integrating excellent aesthetics of a wainscot panel. Historic treatments of real wood wainscot are well established and very expensive. Beyond the multiple piece millwork of real wood, some gypsum and polymeric materials have been fabricated into wainscot panels, but are marginally commercially acceptable, partly because they do not have the feel or look of natural wood. There are no wood fiber composite reverse molded wainscot systems available that provide the ease of application that is achieved in accordance with the principles of the present invention.

SUMMARY OF THE INVENTION

In brief, the present invention is directed to a reverse molded fiberboard panel; a wainscot kit comprising a plurality of differently sized reverse molded panels, and a planar finishing or spacer panel, adapted to completely cover any size wall between a wall base board and a wall chair rail; and a method of reverse molding a loose cellulosic mat, in a single pressing step, to provide one or more relatively high density, raised panels without requiring preliminary pressing, or other pre-shaping step, such as scalping. The reverse-molded panels are molded in a conventional, multi-opening fiberboard press, in a single pressing step process, while achieving excellent transfer of mold detail (embossing fidelity) without visually noticeable fiber fracture. The panels can include a foil, an impregnated paper overlay, or thermoplastic coating materials but do not require an overlay or high resin content coating to achieve excellent embossing fidelity and appearance.

In the preferred embodiment, the loose cellulosic mat that is molded is manufactured by the dry process to provide a smooth, planar back surface surrounding the back surface of the raised, molded panels, rather than a screen back pattern which results from pressed mats made by the wet process. The reverse molded raised panel design provides a raised profile (profile up) that is sharp and crisp with sharp detail in exterior corners that has the appearance and feel of hand crafted natural wood millwork, but actually is a reverse-molded, high density wood composite material that can be adhesively secured to a planar wall, such as gypsum wallboard.

Accordingly, one aspect of the present invention is to provide reverse molded, wood composite articles, and a method of manufacturing the articles, wherein the articles are molded from a loose mat of cellulosic fiber and binder, such that the articles have an upwardly raised panel that simulates natural wood millwork.

Another aspect of the present invention is to provide reverse molded, wood composite articles, and a method of manufacturing the articles, in kit form, such that the articles can be securely adhered to any planar surface, such as a gypsum wallboard, or plaster wall, to fill the entire wall area between a base board and a chair rail, while providing sharp, crisp exterior corners on the reverse molded, raised panel, to simulate natural wood, handcrafted millwork.

Another aspect of the present invention is to provide a wainscot kit comprising a plurality of reverse molded wood composite articles having different widths and a planar panel that can be easily cut to a desired width to fill an entire wall between a base board and a chair rail.

Still another aspect of the present invention is to provide a reverse molded wood composite article that provides exact transferring of mold detail at exterior corners and contours in a single pressing operation without requiring multiple press steps, post mold curing at elevated temperatures, or a foil or a high resin content (5–25%) outer surface portion.

Another aspect of the present invention is to provide reverse molded wood composite articles that can be molded from cellulosic mats that do not require synthetic fibers, scrim surfaces, layering of short and long fibers, resin-impregnated paper overlays, thermoplastic varnishes, or needling (needle punching) to hold the mat together prior to molding.

A further aspect of the present invention is to provide a reverse molded wood composite article that has one or more raised panels including a centrally disposed rectangular panel portion of 5–10 mm in height, surrounded by a raised, molded, contoured millwork design having a plurality of raised, planar steps ascending upwardly and inwardly integral with rounded contours to a rounded top portion that has increased density at a rounded apex, to prevent damage and surface fiber fractures, and has a geometry such that sharp, crisp surface detail is provided, particularly at exterior corners of the millwork geometry, in a single pressing (molding) step, while providing substantially uniform density in all but the rounded apex of the raised, molded rectangular millwork design.

Another aspect of the present invention is to provide a reverse molded wood composite article that can be molded in a strip of multiple parts in a single pressing (molding) operation and can be cut into separate parts after molding and then coated with a water-based and/or solvent-based coating material, e.g., paint or stain.

Still another aspect of the present invention is to provide a wainscot kit that includes a plurality of reverse molded wood composite articles to provide at least two differing raised panel (window) sizes, at least two different composite article widths, wherein a smaller width composite article has a proportionately smaller raised panel width, and a planar spacer panel, so that the combination of composite articles can completely fill a wall between a base board and a chair rail by cutting the planar spacer panel to size at inside wall corners for covering the full wall width up to the chair rail.

More particularly, the preferred reverse molded articles in the kit are provided in widths of 12 inches, 16 inches and 48 inches with the 12 inch and 16 inch widths having windows (raised panels) of different sizes; and the 48 inch wide article having three windows of a size to match either the 12 inch wide or 16 inch wide article.

Another aspect of the present invention is to provide a reverse molded wood composite article that has one or more raised panels comprising a central, planar raised portion surrounded by a rectangular raised millwork design, the raised panels being surrounded by planar stiles and rails wherein the raised panels are capable of being separated from the surrounding planar stiles and rails, e.g., via sawing or back sanding, from the surrounding planar base so that the separated panels can be adhered to a household door, cabinet door, shutters, furniture, library or millwork walls, or as a framing material by further removing the central planar raised panel portion.

The above and other aspects and advantages of the present invention will become more apparent from the following detailed description of the preferred embodiments, taken in conjunction with the drawings.

BRIEF DESCRIPTION OF THE DRAWINGS

FIG. 6 is a side view of the wood composite wainscot article of the present invention adhered to drywall between a base board and a chair rail, taken along the line 6—6 of FIG. 7;

FIG. 6A is a side view, similar to FIG. 6, showing a prior art wainscot article secured to drywall with shim spacers.

BRIEF DESCRIPTION OF THE PREFERRED EMBODIMENTS

Figure 2:
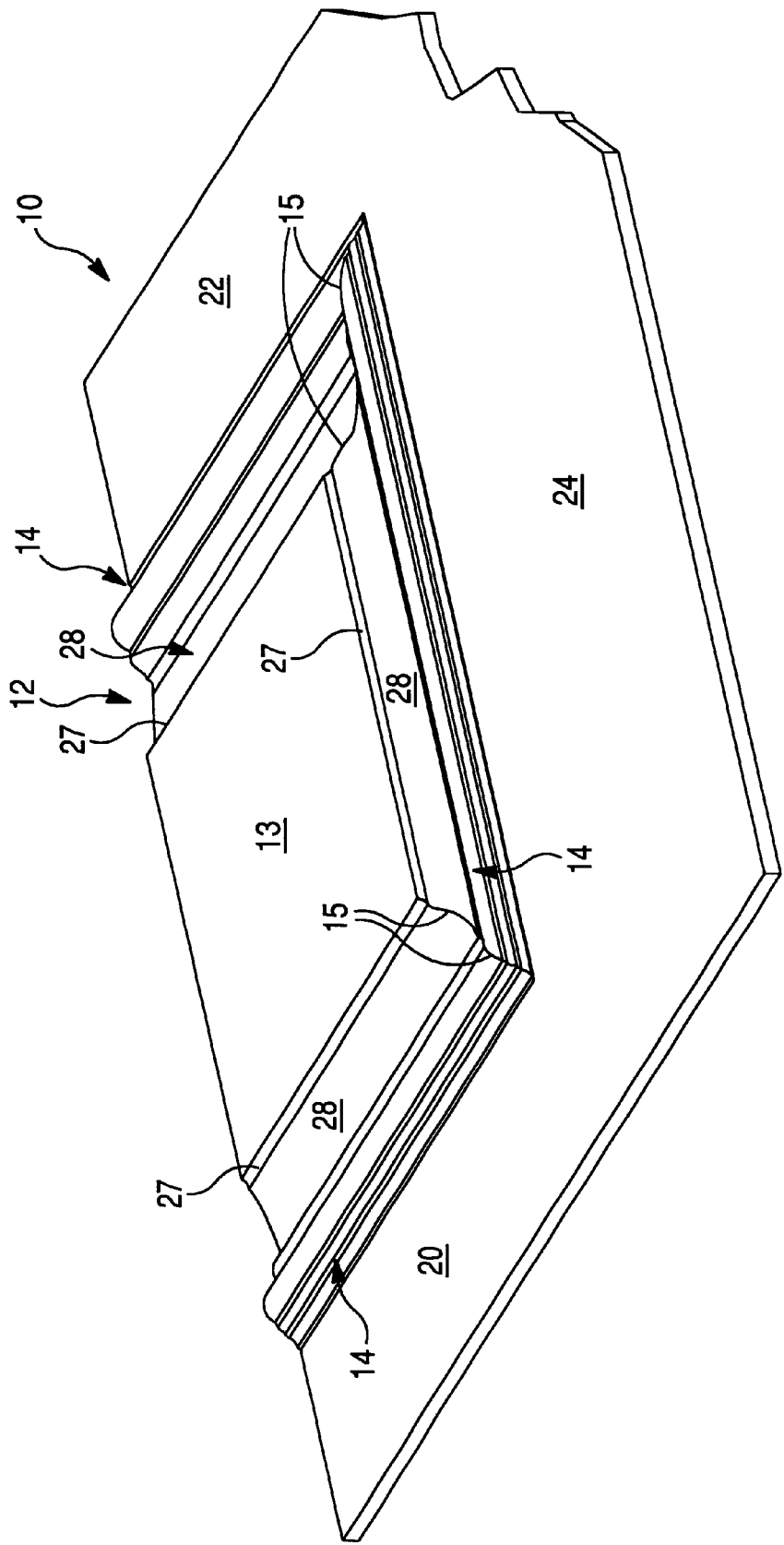
FIG. 2 is a partially broken-away perspective view of the reverse molded wainscot wood composite article of the present invention showing the preferred geometry of the raised panels.

In the preferred embodiment shown in the drawings, the molded wood composite articles of the present invention are molded in the form of wainscot paneling to be adhered to a planar interior wall between a wall base board and a wall chair rail, to simulate solid, natural wood wainscot millwork, as shown in FIG. 2. It should be understood, however, that the principles of the present invention apply to much more than the manufacture of wainscot and also applies to the manufacture of doors or door skins, particularly cabinet door facings, as well as any molded, man-made composite wood article that includes one or more reverse-molded raised millwork designs adjacent to a planar surface portion of the molded article. Examples of other composite, reverse-molded wood articles that are capable of being manufactured in accordance with the principles of the present invention include decorative hardboard; interior and exterior passage door skins, cabinet door skins, and garage door skins; decorative interior wall paneling; cabinetry and furniture surface moldings; molded panels separated from their surrounding planar portions to be adhered to an outer planar surface of a cabinet, cabinet door, or planar furniture portion; furniture components; and the like.

The dimensions of the reverse molded composite articles of the present invention preferably varies from 5 inches to 96 inches in width and from 12 inches to 60 inches or even 96 inches in height.

The articles of the present invention preferably are formed from at least 80% by weight fibrillated cellulosic fibers, based on the total, dry weight of fibers in the articles, and a binder capable of adhering the cellulosic fibers together into a structurally stable, consolidated article. The cellulosic fibers are in the form of refined, fibrillated fibers and can be molded and adhered together with natural or synthetic binders to provide aesthetically pleasing molded contours, and smooth or wood grain texture surfaces in all exterior, visible surfaces, including the molded, raised panel surfaces. The articles of the present invention can be molded as a thin, e.g., 0.1 to 0.3 inch wainscot, or raised panels can be cut or back sanded to remove the raised panels for adherence to a cabinet door or the like to provide a raised, hand-crafted, natural wood millwork look onto any planar surface.

In accordance with the present invention, the reverse-molded articles of the present invention can be adhesively applied or otherwise fastened to any planar support structure.

Figure 1:
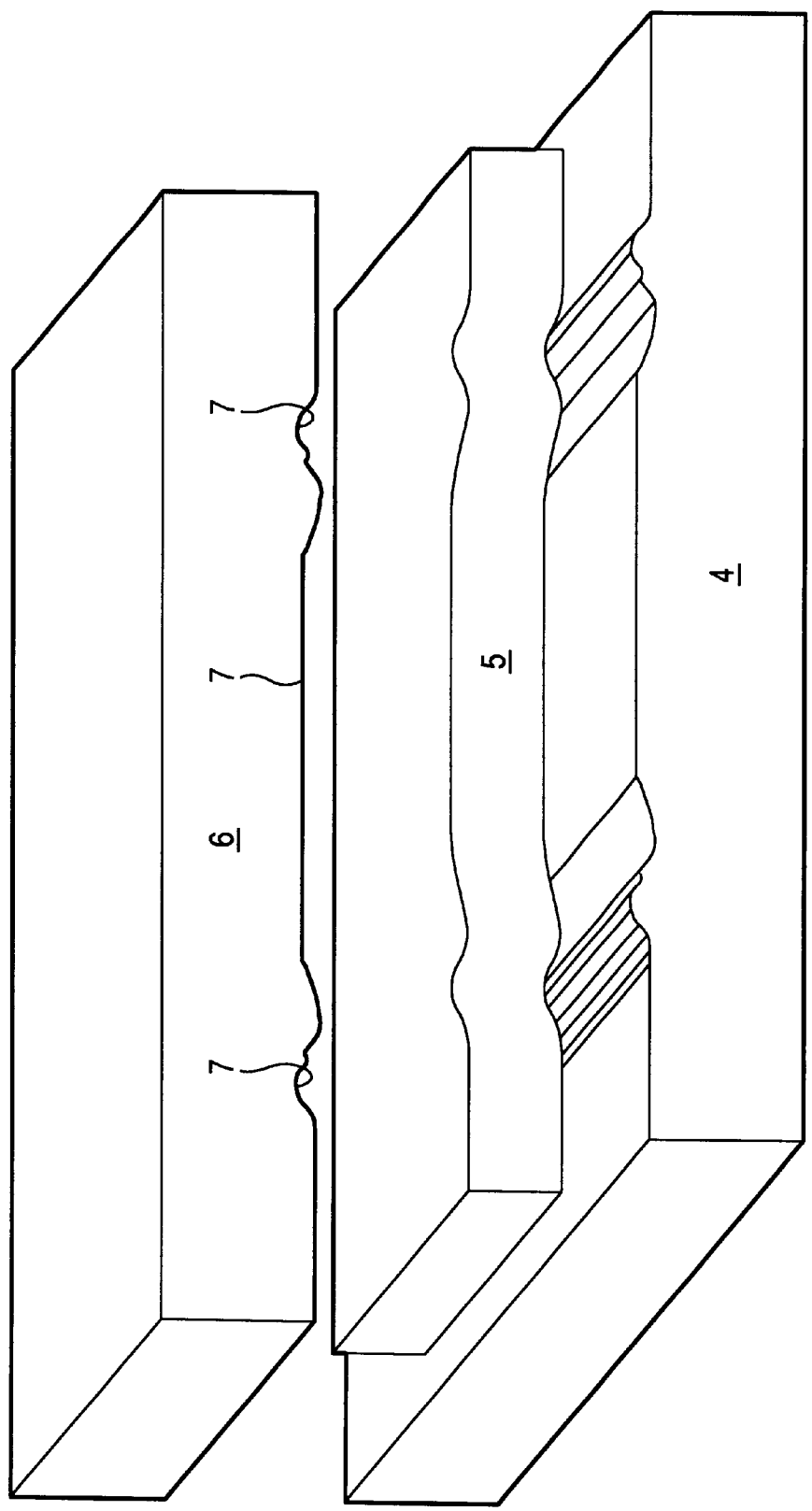
FIG. 1 is a partially broken-away perspective view of a loose, dry-laid composite cellulosic mat laid between a lower mold cavity and an upper mold core, showing the mat being loose enough to contour over the raised panel contours of the mold cavity prior to pressing.

Turning now to the drawings, and initially to FIG. 1, there is illustrated a partially broken-away perspective view of a portion of a mold, including a lower mold half or mold cavity 4, having a partially broken-away cellulosic mat 5 laid thereover, and an upper mold core 6, for pressing the mat 5 into a wainscot panel, generally designated by reference numeral 10. The upper mold core 6 has a mold depression 7 in its undersurface that is shaped complementary to the upwardly extending mold design shown in lower mold cavity 4 for pressing the mat 5 therebetween to conform to a mold cavity between the mold halves 4 and 6. The wainscot panel 10 is reverse molded, as shown in FIGS. 1 and 2, between the raised panel-simulating lower mold cavity 4, and the upper mold core 6, to provide raised panels 12 in the molded article 10, including centrally disposed, planar raised panel portions 13, and rectangular contoured wall portions, generally designated by reference numeral 14, including raised exterior corners 15 on the panel outer surfaces that correspond to contours essentially identical to raised contours of the lower mold cavity 4. The reverse molded panel 10 can be secured, e.g., adhesively, or via fasteners, such as nails or screws, to a suitable planar surface, such as a wainscot wall area of an interior home room. The lower mold cavity 4 is essentially the same in general contour as an upper surface of the wainscot panel 10, except that the lower mold cavity 4 would be slightly smaller horizontally, in the raised panel dimensions, to allow for the thickness of the molded cellulosic mat 5 that is molded to the upwardly extending raised panel design shown in FIG. 2. The upper mold core 6 carries a raised panel-receiving mold cavity 7 dimensioned complementary to the upper surface of the raised panel structure 12, and can be smoothly contoured or can include downwardly extending structure (not shown) to emboss simulated wood grain ticks that form a wood grain pattern.

Figure 3:
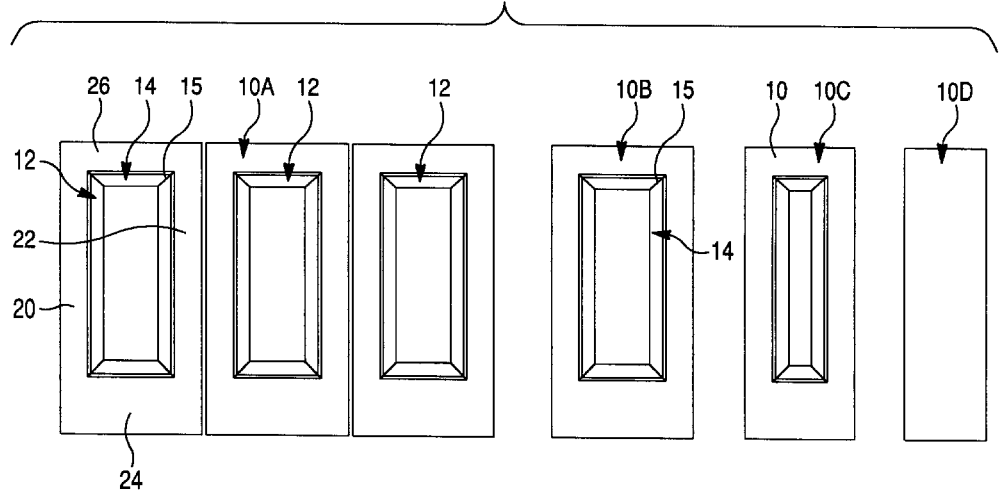
FIG. 3 is a front view of the components of a wainscot kit comprising four different articles—three reverse molded panels and one planar panel—capable of completely filling a wall between a base board and a chair rail while only cutting the planar panel to size to fill the entire wall up to the chair rail.

The wainscot panel 10 is molded with the mold cavity, disposed between die halves 4 and 6, disposed in a generally horizontal disposition so that the upper major surface will be described as horizontal—corresponding to its disposition during molding—and it will be recognized that the position of the molded article, in use, is usually intended to be vertical, instead of horizontal, as in the case of wainscot panel 10, as shown in FIGS. 2–7. The "raised profile up" molded outer major surface of the wainscot panels 10 is disposed in a vertical orientation ("raised profile out") between a wall base board 16 and a wall chair rail 18, as shown in FIG. 6. The exemplary wainscot panel 10, shown in FIG. 2, in the preferred embodiment, includes one or more of the raised panels 12, which are molded to provide contoured walls, generally designated by reference numeral 14, integral with and surrounding the centrally disposed planar raised panel portion 13, and the contoured walls 14 are integral with and surrounded by planar vertical stiles 20 and 22 and horizontal rails 24 and 26, respectively, lying in a common plane, for adhesive securement of an undersurface of each stile and rail 20, 22, 24 and 26 to a planar wall, as shown in FIGS. 3 and 6.

Figure 4:
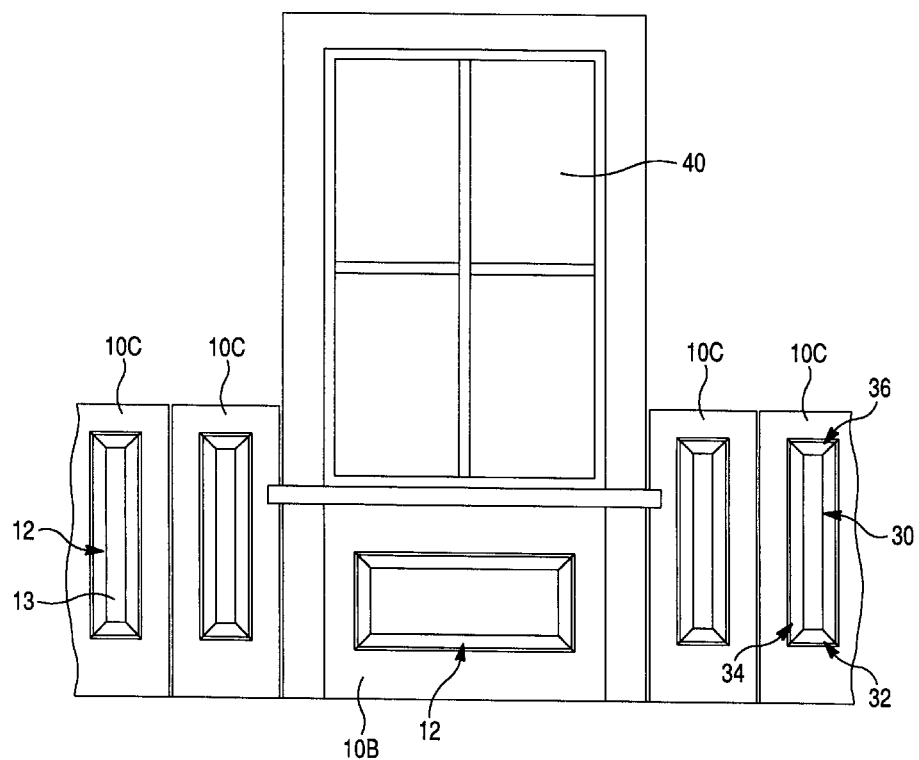
FIG. 4 is a partially broken-away front view of a portion of a wall containing an oversized window, showing one way to fit the kit of FIG. 3 onto a wall having an oversized window.
Figure 5:
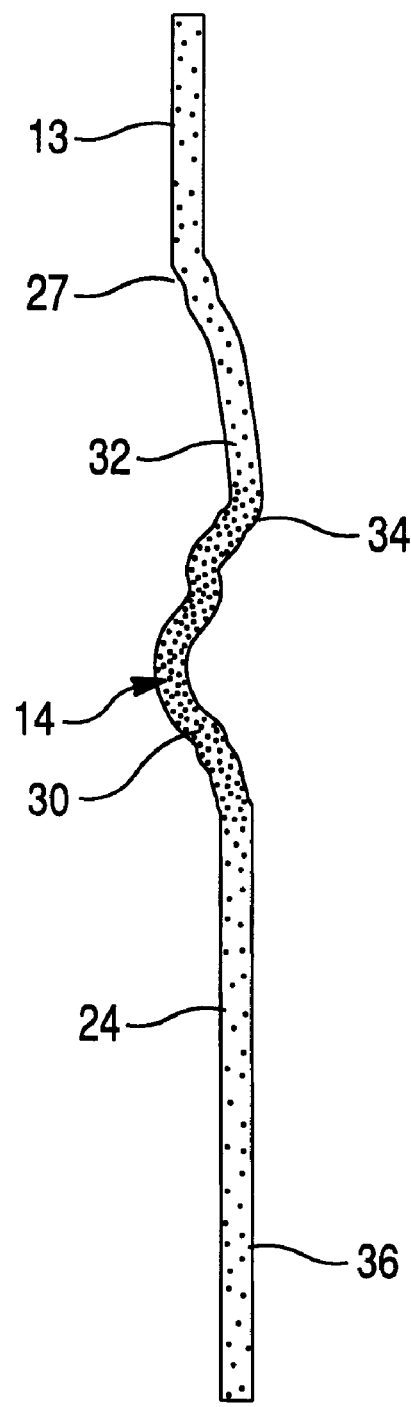
FIG. 5 is a partially broken-away side view of the reverse molded wood composite article of the present invention showing the profile of the reverse-molded raised panel design.
Figure 7:
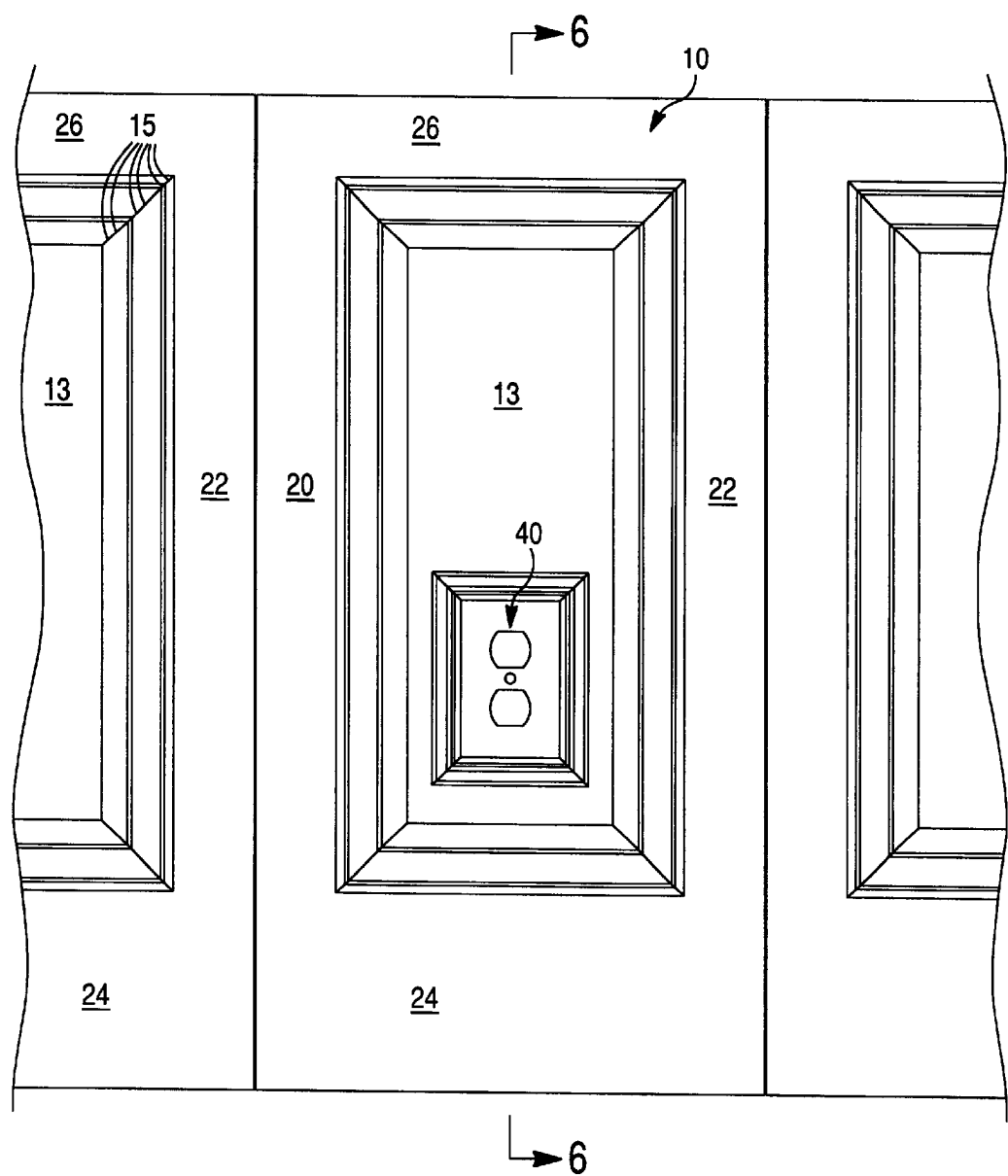
FIG. 7 is a front view of the wood composite wainscot article of the present invention secured to a wall and showing a new design for a switch plate that can be secured to the wall through the wainscot article, even if the electrical outlet falls within the raised panel design.

In the preferred wainscot panel 10, best shown in FIGS. 2–4, the reverse molded contoured walls 14 are molded in a rectangular shape, surrounding the centrally disposed planar panel portion 13, and the contoured walls 14 are interconnected to outer edges 27 of the planar panel portion 13 through sloping walls 28, disposed therebetween. As best shown in the panel profiles of FIGS. 5 and 6, the contoured walls 14 include a wall portion 30 that is integral with and extends upwardly from an adjacent stile or rail (24, as shown in FIG. 5) at an angle of about 25° to about 35° above horizontal (as molded in the horizontal position). Wall portion 30 then is curved downwardly in a generally U-shaped contoured wall portion 32 integral at its outer end with wall portion 30, and integral at its inner end with the planar, raised panel portion 13, at outer edges 27 (FIGS. 2 and 5) of the planar, raised panel portion 13. Each of the four contoured walls 14 that form the reverse molded rectangles of each raised panel 12 are of identical contour. In accordance with the preferred embodiment, U-shaped contoured wall portion 32 is contoured such that an innermost undersurface 34 (as applied against a wall) of the contoured wall portion 32, at the base of the U, lies in the same plane as an undersurface 36 of the stiles and rails 20, 22, 24 and 26, so that the undersurface 34 of U-shaped wall portion 32, at the base of the U, contacts, and can be adhered to, wall 37 for structural support when in position (as shown in FIG. 6).

The articles of the present invention are molded from a loose mat of cellulosic fibers and a thermosetting binder, such as a urea formaldehyde, melamine formaldehyde, and/or phenol formaldehyde binder commonly used in the manufacture of fiberboard. The mat should include at least about 80% fibrillated, refined cellulosic fibers, preferably 100%, based on the total, dry fiber weight in the mat 5. The fibers are mechanically refined from wood chips preferably using steam pressures in the range of about 80 to 120 psi, more preferably about 100 to 110 psi, most preferably about 105 psi. Steam pressures higher than about 120 psi in refining the cellulosic fibers produce highly refined fibers that are useful in accordance with the present invention, but the cost of refining would be commercially prohibitive.

Such refining of cellulosic fibers will provide fibrillated cellulosic fibers that are preferably dry laid into a loose cellulosic fiber mat having a basis weight in the range of 0.58 to 0.62 pounds per cubic inch. Upon molding in a heated press at a temperature in the range of about 385° F. to 450° F., and at a maximum pressure in the range of about 550 to about 850 psi, the resulting embossed articles will have a specific gravity in the range of about 0.96 to about 1.08, preferably about 0.98 to about 1.06, more preferably about 1.00 to about 1.04. Articles of the present invention that are "profile up" compensate to increase density and surface toughness by reducing caliper at the highest point in the design profile to about 1.02 to about 1.08 specific gravity, with a target of 1.02 to 1.04 specific gravity, whether smooth or textured. The flat surface geometry surrounding the profile zones is pressed to a slightly lower specific gravity of 1.00 to 0.98 by slightly increasing the caliper within these zones.

In accordance with another important embodiment of the present invention, the reverse molded panels 10 of the present invention can be produced in a plurality of widths, as shown in FIG. 3, for example, a molded panel 10A that is, for example, 48 inches wide, having three raised panels 12, a panel 10B that is, for example, 16 inches wide, having a single raised panel 12; a panel 10C that is, for example, 12 inches wide, having a single raised panel 12; and a planar panel 10D that is, for example, 8 inches wide, and can be cut easily lengthwise, to complete a wall. Each panel 10A, 10B, 10C and 10D is the same height of, for example, 32 inches—a standard wainscot height. As shown in FIG. 3, the panels, e.g., 10B or 10C, can be arranged under windows 40, by rotating the panel (10B, as shown in FIG. 3) 90° so that the raised panel 12 has its length in a horizontal disposition and, if necessary, when windows are lower to the floor, panel 10C can be used instead, together with one or two planar panels 10D above and/or below panel 10C.

The wainscot kit shown in FIG. 2 can be easily installed by the homeowner by starting at the center of the room, or directly under a center window, and arranging the panels symmetrically toward inside corners of the spaced wall ends. By arranging the panels 10B and/or 10C properly, the 8 inch width planar panels 10D will be of sufficient width to fill all walls, to the wall ends, defined at inside room corners, and can be cut accurately to completely fill the wall.

In accordance with another aspect of the present invention, electrical light switch plates (not shown) and outlet covers, generally and collectively referred to by reference numeral 40 (FIG. 7), are provided in the kit shown in FIG. 3. These outlet covers 40 and switch plates (not shown) are rectangular and have outermost vertical walls 42 that are at least as high as the raised contoured walls 14 and planar raised panel portions 13 of panels 12 so that wherever the light switch plates and/or electrical outlet covers 40 are positioned within the wainscot panels 10, a hole is cut in the panels 12 to the same outer dimensions as the switch plate cover or outlet cover 40, and the outlet cover 40 is inserted against the wall (within the panel), without exposing a cut panel, since the cuts in panel 12 will be flush against the outermost walls 42 of the outlet cover 40, as shown in FIG. 8.

The foregoing description is given for clearness of understanding only, and no unnecessary limitations should be understood therefrom, as modifications within the scope of the invention may be apparent to those skilled in the art.

What is claimed is:

1. A wood composite article reverse molded from a mat of refined cellulosic fibers and sufficient binder to adhere the cellulosic fibers together into a structurally sound article having a specific gravity in the range of 0.96 to about 1.08, said article comprising a first planar surface portion surrounding an outwardly protruding second planar surface portion, said first and second planar surface portions having a substantially uniform density, and said second planar surface portion having a plurality of exterior corners simulating natural wood millwork, a coplanar back surface for adhering said back surface to a planar surface of a substrate, and an upwardly and inwardly contoured portion extending between and interconnecting said first and second planar surface portions, said contoured portion having a density higher than the density of said first and second planar surface portions.

2. A wood composite article in accordance with claim 1, wherein the article includes less than 5% by weight resin binder.

3. A wood composite article in accordance with claim 2, wherein the resin binder is homogeneously distributed throughout the article.

4. A wood composite article in accordance with claim 3, wherein the article does not include a thermoplastic coating material on the cellulosic mat, and does not include a resin-impregnated paper overlay.

5. A wood composite article in accordance with claim 1, wherein the mat of cellulosic fibers is made by the dry process and has a smooth planar back surface.

6. A wood composite article in accordance with claim 1, further including a planar wall substrate adhered to said planar back surface of said article.

7. A wood composite article in accordance with claim 6, wherein the planar wall substrate is adhered to said planar back surface of said article by fasteners or an adhesive without a shim spacer disposed between said planar wall substrate and said planar back surface of said article.

8. A wood composite article in accordance with claim 1, wherein the outwardly protruding contoured panel extends outwardly from the surrounding planar surface portions a distance of 5–10 mm.

9. A wood composite article in accordance with claim 1, wherein the cellulosic mat includes at least 40% by weight softwood fibers, based on the total weight of cellulosic fibers in the article.

10. A wood composite article in accordance with claim 9, wherein the softwood fibers are selected from pine, spruce and a mixture thereof.

11. A wood composite article in accordance with claim 10, wherein the cellulosic fibers are about 100% by weight softwood fibers.

12. A wood composite article in accordance with claim 1, wherein the protruding contoured panel extends outwardly and inwardly from a surrounding planar surface at an angle in the range of 25–35°.

13. A wood composite article in accordance with claim 12, wherein the protruding contoured panel extends outwardly and inwardly from a surrounding planar surface at an angle in the range of 30–35°.

14. A method of making a contoured raised panel for securing to a planar surface comprising molding a wood composite article in accordance with claim 1, and then separating the raised panel from the surrounding planar surface portions.

15. A wainscot kit comprising a first and a second wood composite articles in accordance with claim 1, said first and second wood composite articles each having the same height and a different width, and each of said first and second wood composite articles having an outwardly protruding contoured panel of the same height and a different width; and a third, planar wood composite article, said three wood composite articles capable of covering an entire wall, between a wall base board and a wall chair rail, by cutting only the third, planar panel to size, at a wall corner.

16. A wainscot kit in accordance with claim 15, further including a fourth wood composite article having multiple, spaced, outwardly protruding contoured panels and being wider than the first, second, and third wood composite articles.

17. A wainscot kit in accordance with claim 15, further including a rectangular electrical outlet cover having apertures adapted to cover a rectangular area surrounding an electrical outlet, while leaving the electrical outlet exposed for connection of an electrical device thereto, and having side walls extending perpendicular to an outlet-containing wall, said side walls being dimensioned at least as high as a height of said protruding contoured panels in said reverse molded wood composite articles, such that an aperture formed in a panel of said wood composite article for receiving said electrical outlet cover, will be in contact with, and hide from view, cuts made in the wood composite article having the formed aperture.

18. A method of manufacturing a reverse molded wood composite article comprising the steps of:
   disposing a mat of cellulosic fibers and a resin binder over an essentially horizontal lower mold having planar surface portions surrounding an upwardly protruding contoured millwork-simulating design, including a plurality of exterior corners; and
   pressing the mat against an upper mold that is inwardly contoured on a mat-containing undersurface, the inward contours in the upper mold being shaped complementary to the upwardly protruding contoured millwork-simulating design extending upwardly from the lower mold so that density of the mat is increased at points corresponding to the upwardly protruding contoured millwork-simulating design relative to density of the mat at points corresponding to the planar surface portions, whereby said pressing structurally consolidates the mat into an article having a specific gravity of about 0.96 to about 1.08.

19. A method in accordance with claim 18, wherein the article includes less than 5% by weight thermosetting resin binder.

20. A method in accordance with claim 19, wherein the resin binder is homogeneously distributed throughout the article.

21. A method in accordance with claim 20, wherein the article does not include a thermoplastic coating material on the cellulosic mat, and does not include a resin-impregnated paper overlay.

22. A method in accordance with claim 18, wherein the mat of cellulosic fibers is made by the dry process and has a smooth planar back surface.

23. A method in accordance with claim 18, further including adhering a planar wall substrate to said planar back surface of said article.

24. A method in accordance with claim 23, wherein the planar wall substrate is adhered to said planar back surface of said article without a shim spacer disposed between said planar wall substrate and said planar back surface of said article.

25. A method in accordance with claim 18, wherein the outwardly protruding contoured panel is molded outwardly from the surrounding planar surface portions a distance of 5–10 mm above a surrounding planar base.

26. A method in accordance with claim 18, wherein the cellulosic mat includes at least 40% by weight softwood fibers, based on the total weight of cellulosic fibers in the article.

27. A method in accordance with claim 26, wherein the softwood fibers are selected from pine, spruce and a mixture thereof.

28. A method in accordance with claim 27, wherein the cellulosic fibers are about 100% by weight softwood fibers.

29. A method in accordance with claim 18, wherein the protruding contoured panel is molded outwardly and inwardly from a surrounding planar surface at an angle in the range of 25–35°.

30. A method in accordance with claim 29, wherein the protruding contoured panel is molded outwardly and inwardly from a surrounding planar surface at an angle in the range of 30–35°.

* * * * *